United States Patent [19]

Hayashi et al.

[11] Patent Number: 5,708,475
[45] Date of Patent: Jan. 13, 1998

[54] RECEIVING APPARATUS AND RECEIVING METHOD

[75] Inventors: Toshihide Hayashi, Kanagawa; Akiko Morisawa, Tokyo, both of Japan

[73] Assignee: Sony Corporation, Tokyo, Japan

[21] Appl. No.: 657,623

[22] Filed: May 15, 1996

[30] Foreign Application Priority Data

May 26, 1995 [JP] Japan ..................................... 7-127815

[51] Int. Cl.⁶ .................................................. H04N 7/087
[52] U.S. Cl. ........................................... 348/468; 348/564
[58] Field of Search ..................................... 348/468, 465, 348/722, 725, 726, 564, 565, 563, 553, 556

[56] References Cited

U.S. PATENT DOCUMENTS

| | | | |
|---|---|---|---|
| 5,023,721 | 6/1991 | Moon-Hwan | 348/564 |
| 5,128,766 | 7/1992 | Choi | 348/564 |
| 5,477,274 | 12/1995 | Akiyishi et al. | 348/564 |
| 5,500,680 | 3/1996 | Lee | 348/564 |
| 5,602,598 | 2/1997 | Shintani | 348/565 |
| 5,610,664 | 3/1997 | Bobert | 348/468 |

*Primary Examiner*—Victor R. Kostak
*Attorney, Agent, or Firm*—Jay H. Maioli

[57] ABSTRACT

A receiving apparatus including first and second tuners for receiving telecast signals and demodulating the signals of predetermined channels; a decoder for extracting the character broadcast data from either of the demodulated signals and decoding the extracted data; a selector switch for selecting either of the signals obtained from the first and second tuners and supplying the selected signal to the decoder; a controller for controlling the selector switch during its selection of the output signal from the second tuner in such a manner as to force the switch to periodically select the demodulated signal outputted from the first tuner; and a detector for detecting whether the character broadcast data extracted by the decoder represent a caption or not when the switch has selected the output signal from the first tuner; wherein, if the result of the detection by the detector signifies that the character broadcast data represent a caption, the controller forces the switch to select the output signal from the first tuner. In this apparatus, when any caption broadcast is started by teletext, priority display of the caption can be realized without enlarging the apparatus structure or raising the production cost thereof.

5 Claims, 7 Drawing Sheets

WHEN VIEWING ONLY TV BROADCAST

WHEN VIEWING BOTH TV BROADCAST AND TELETEXT

WAVEFORMS IN VERTICAL RETRACE BLANKING PERIOD

FIG. 2  FUNDAMENTAL PARAMETERS IN TRANSMISSION SYSTEM

| ITEM | STANDARD SYSTEM | CODED TRANSMISSION SYSTEM | |
|---|---|---|---|
| | | BASIC LEVEL | EXTENSION LEVEL |
| TRANSMISSION TYPE | PATTERN | CODE / PATTERN HYBRID | |
| SIGNAL SYSTEM | BINARY NRZ, 5.727272 Mb/s | | |
| DISPLAY MODE | WHOLE-SCREEN STATIONARY DISPLAY, WHOLE-SCREEN VERTICAL SCROLL DISPLAY | WHOLE-SCREEN STATIONARY DISPLAY, SUPERIMPOSED STATIONARY DISPLAY, CAPTION DISPLAY, VERTICAL SCROLL DISPLAY, ONE-ROW HORIZONTAL SCROLL DISPLAY | |
| FORMAT AND NUMBER OF DISPLAY CHARACTERS (STANDARD CHARACTERS) | HORIZONTAL WRITING : 15 CHARAC. x 8 ROWS | | HORIZONTAL WRITING : 15 CHARAC. x 8 ROWS 31 CHARAC. x 16 ROWS VERTICAL WRITING : 10 CHARAC. x 12 ROWS 20 CHARAC. x 24 ROWS |
| NUMBER OF COMPONENT PIXELS | HORIZONTAL 248 x VERTICAL 204 | | HORIZONTAL 248 x VERTICAL 204 HORIZONTAL 512 x VERTICAL 408 |
| KINDS OF COLORS COLORING METHOD | 8 COLORS, 1 GRADATION 2-COLOR DISTINCTION IN COLORED BLOCK COLORED BLOCK : 8 x 12 DOTS | 8 COLORS, 2 GRADATIONS 2-COLOR DISTINCTION IN COLORED BLOCK COLORED BLOCK : 4 x 4 DOTS | 16 COLORS OUT OF 4096 COLORS 2-COLOR DISTINCTION 4-COLOR DISTINCTION COLORED BLOCK : 4 x 4 DOTS, 1 DOT |
| CODE DISPLAY | FLUSHING (SIMPLE, ALTERNATE) CONCEAL (SIMPLE) | | FLUSHING (SIMPLE, ALTERNATE) CONCEAL (MULTISTAGE, REPLACE) RESPONSE DISPLAY |
| CHARACTERS | PER PIXEL | KANJI : 2965 CHARACTERS   2-BYTE CODE TRANSMISSION NON-KANJI : 245+α  2-BYTE CODE TRANSMISSION (KANA, ALPHABETS AND NUMERALS : 1-BYTE CODE TRANSMISSION) EXTERNAL CHARACTER : PER PIXEL | |
| GRAPHIC | PER PIXEL | MOSAIC GRAPHIC (COHERENT, SEPARATE, SMOOTH) 1-PIXEL GRAPHIC AS UNIT | |
| ELECTRONIC MUSIC | | MELODY : 9 KINDS OF TONES 8 SIMULTANEOUSLY GENERABLE TONES RHYTHM : 7 KINDS | MELODY : 15 KINDS OF TONES 8 SIMULTANEOUSLY GENERABLE TONES RHYTHM : 7 KINDS OF TONES |
| TRANSMISSION RATE | CHARACTER : 3 SEC/PAGE GRAPHIC : 4 SEC/PAGE | CHARACTER : 0.2 SEC/PAGE (120 CHARACTERS) MOSAIC GRAPHIC : 0.4 SEC/PAGE ON AVERAGE DOT GRAPHIC : 2 SEC/PAGE ON AVERAGE | |

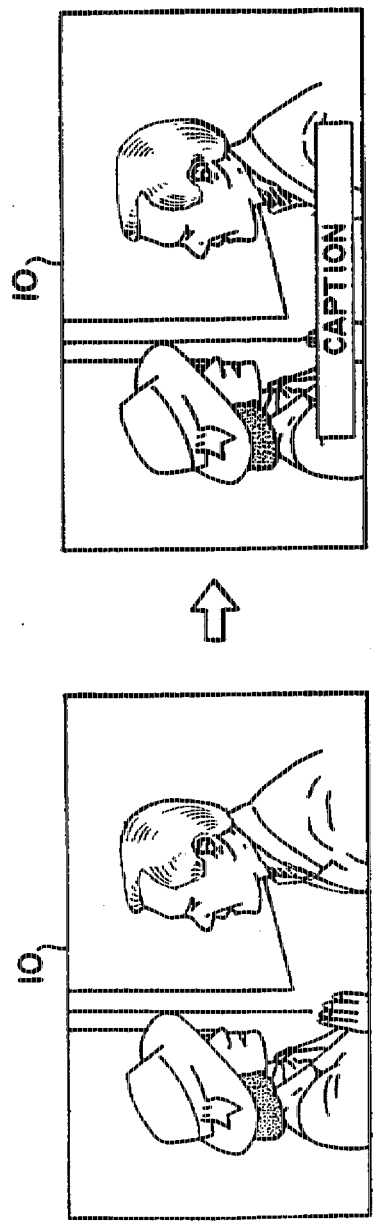
FIG. 7A WHEN VIEWING ONLY TV BROADCAST
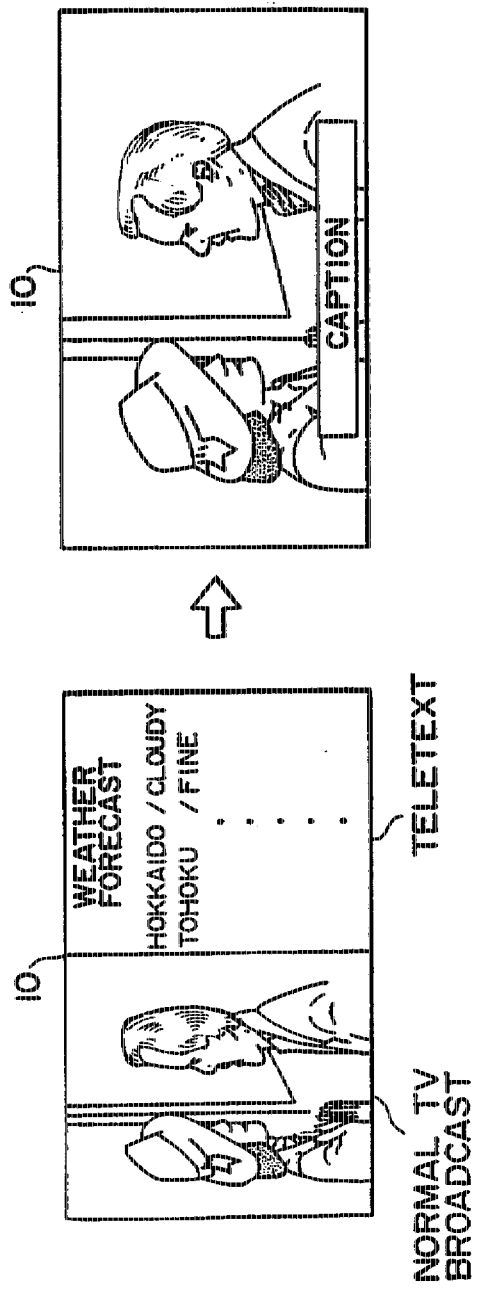
FIG. 7B WHEN VIEWING BOTH TV BROADCAST AND TELETEXT

RECEIVING APPARATUS AND RECEIVING METHOD

BACKGROUND OF THE INVENTION

The present invention relates to a receiving apparatus and a receiving method, and more particularly to those capable of periodically detecting whether a caption is being broadcast or not and, in the presence of any caption being broadcast, displaying such a caption with priority.

In the related art television receivers designed for receiving both multiplex teletext and normal television broadcasts, there is known a type having two tuners and one decoder. In such a television receiver, it is possible to display either one television program of the channels received by the first and second tuners, and also possible to receive a program of one channel by the first tuner while receiving a different program of another channel by the second tuner, thereby displaying the output of the first tuner on a parent screen while displaying the output of the second tuner on a child screen. In this case, a viewer can watch the programs of two channels simultaneously.

Further the known television receiver is so contrived that its screen is divided into two, and the output of the first tuner is displayed on one partial screen, while character broadcast data (teletext data) transmitted for multiplex teletext is first extracted and decoded in the decoder and then is displayed on the other partial screen.

Suppose now an exemplary case where, in the television receiver mentioned above, a program of one channel alone is watched with the first tuner serving as a main tuner. When the first tuner is used for receiving the program in this manner, it has been customary heretofore in the related art that the second tuner is used to refresh a memory for displaying the character broadcast data.

More specifically, since the received character broadcast data is displayed after being once stored in a memory, if the display mode on the screen is switched to the teletext during the display of a program of one channel, the character broadcast data is not displayed until completion of storing the character broadcast data of, e.g., one line (horizontal scanning line) or one frame. Therefore, in order to realize immediate display of character broadcast data, an operation is performed in such a manner that, when merely the first tuner alone is in use, a television broadcast (teletext) of the channel reserved by the viewer is received by the second tuner and then is decoded, so that the latest character broadcast data obtained is written in the memory.

When watching a program of one channel, some viewers may desire display of a caption thereof if the caption begins to be broadcast on that channel by teletext. Namely, for any having impaired viewer, it is preferred that, if a caption corresponding to the words or contents of the program on that channel is being broadcast, such a caption be displayed with priority.

However, in case a telecast signal of another channel different from the one being currently received by the first tuner is received by the second tuner for refreshing a memory as described and the decoder is in use for decoding the signal received by the second tuner, it has been difficult in the related art to detect whether a caption is broadcast or not on the channel being currently received by the first tuner.

Also in case a normal telecast and a multiplex teletext are being watched simultaneously on two partial screens divided as mentioned, the above problem is similarly existent when the normal telecast channel and the multiplex teletext channel are mutually different.

There may be contrived a modified method which incorporates another decoder additionally and decodes the output of the first tuner to thereby detect whether a caption is being currently broadcast or not on the channel being received by the first tuner. However, according to this method, an additional decoder is required to consequently increase the number thereof, whereby the apparatus is rendered structurally more complex with another disadvantage of raising the production cost.

SUMMARY OF THE INVENTION

It is therefore an object of the present invention to provide an improvement without enlarging the structure of the apparatus or raising the production cost thereof, wherein a detection is performed as to whether a caption is currently broadcast or not on the channel being received and, if the result of the detection signifies the presence of any caption being broadcast, such caption is displayed with priority.

According to one aspect of the present invention, there is provided a receiving apparatus which includes a first and a second receiving circuit for receiving telecast signals, then demodulating the signals of predetermined channels and outputting the demodulated signals; a decoder circuit for extracting the character broadcast data from either of the demodulated signals outputted from the first and second receiving circuit, and decoding the extracted data; an output circuit for delivering one of the outputs of the first and second receiving circuit and the decoder circuit, or combining arbitrary two of said outputs and then delivering the combined output; a selector circuit for selecting either of the signals outputted from the first and second receiving circuit, and supplying the selected signal to the decoder circuit; a control circuit for controlling the selector circuit during its selection of the demodulated signal outputted from the second receiving circuit, in such a manner as to force the selector circuit to periodically select the demodulated signal outputted from the first receiving circuit; and a detector circuit for detecting whether the character broadcast data extracted by the decoder circuit represent a caption or not when the selector circuit has selected the demodulated signal outputted from the first receiving circuit; wherein, when the result of the detection by the detector circuit signifies that the character broadcast data represent a caption, the control circuit forces the selector circuit to select the demodulated signal outputted from the first receiving circuit.

According to another aspect of the present invention, there is provided a receiving method which is carried out in an apparatus comprising a first and a second receiving circuit for receiving telecast signals where character broadcast data are superimposed as teletext data, then demodulating the signals of predetermined channels and outputting the demodulated signals; a decoder circuit for extracting the character broadcast data from either of the demodulated signals outputted from the first and second receiving circuit, and decoding the extracted data; an output circuit for delivering one of the outputs of the first and second receiving means and the decoder circuit, or combining arbitrary two of the outputs and then delivering the combined output; and a selector circuit for selecting either of the signals outputted from the first and second receiving circuit, and supplying the selected signal to the decoder circuit. The receiving method is characterized by comprising the steps of: when the demodulated signal outputted from the second receiving circuit is selected by the selector circuit, enabling the selector circuit to periodically select the demodulated signal outputted from the first receiving circuit; when the demodulated signal outputted from the first receiving circuit is selected by the selector circuit, detecting whether the character broadcast data extracted by the decoder circuit represent a caption or not; and when the result of such detection signifies that the character broadcast data represent a caption, forcing the selector circuit to select the demodulated signal outputted from the first receiving means.

In the receiving apparatus of the present invention, the first and second receiving circuit receive telecast signals, then demodulate the signals of predetermined channels and output the demodulated signals. Subsequently the decoder circuit extracts the character broadcast data from either of the demodulated signals outputted from the first and second receiving means, and decodes the extracted data. The selector circuit selects either of the signals outputted from the first and second receiving circuit, and then supplies the selected signal to the decoder circuit. The control circuit controls the selector circuit during its selection of the demodulated signal outputted from the second receiving means, in such a manner as to force the selector circuit to cyclically select the demodulated signal outputted from the first receiving circuit, while the detector circuit detects whether the character broadcast data extracted by the decoder circuit represent a caption or not when the selector circuit has selected the demodulated signal outputted from the first receiving circuit. And when the result of the detection by the detector circuit signifies that the character broadcast data represent a caption, the control circuit forces the selector circuit to select the demodulated signal outputted from the first receiving means.

In the receiving method of the present invention, when the demodulated signal outputted from the second receiving circuit is selected by the selector circuit, the selector circuit is enabled to periodically select the demodulated signal outputted from the first receiving circuit. Meanwhile, when the demodulated signal outputted from the first receiving circuit is selected by the selector circuit, a detection is performed as to whether the character broadcast data extracted by the decoder circuit represents a caption or not. And if the result of such detection signifies that the character broadcast data represent a caption, the selector circuit is forced to select the demodulated signal outputted from the first receiving circuit.

The above and other features and advantages of the present invention will become apparent from the following description which will be given with reference to the illustrative accompanying drawings.

BRIEF DESCRIPTION OF THE DRAWINGS

FIG. 2 shows fundamental parameters in a teletext transmission system;

FIGS. 7A and 7B illustrate how a caption is displayed with priority.

DESCRIPTION OF THE PREFERRED EMBODIMENTS

Hereinafter a detailed description will be given on an embodiment of a television receiver which is rendered capable of receiving teletext broadcasts as well by the application of the present invention. Prior to referring to such an embodiment, the teletext known for multiplex character broadcast will be explained briefly as a preliminary thereto.

In the teletext, characters or graphics are broadcast after being superimposed in the form of digital signal during the vertical blanking interval of a television video signal. According to the current teletext, there are provided various information (character broadcast data) inclusive of news, weather forecast, stock price information, guide to programs by telecast and so forth. Further according to the teletext, as described above, a caption representing words or contents of a program can be broadcast and displayed while being superimposed on a normal picture.

Figure 1:
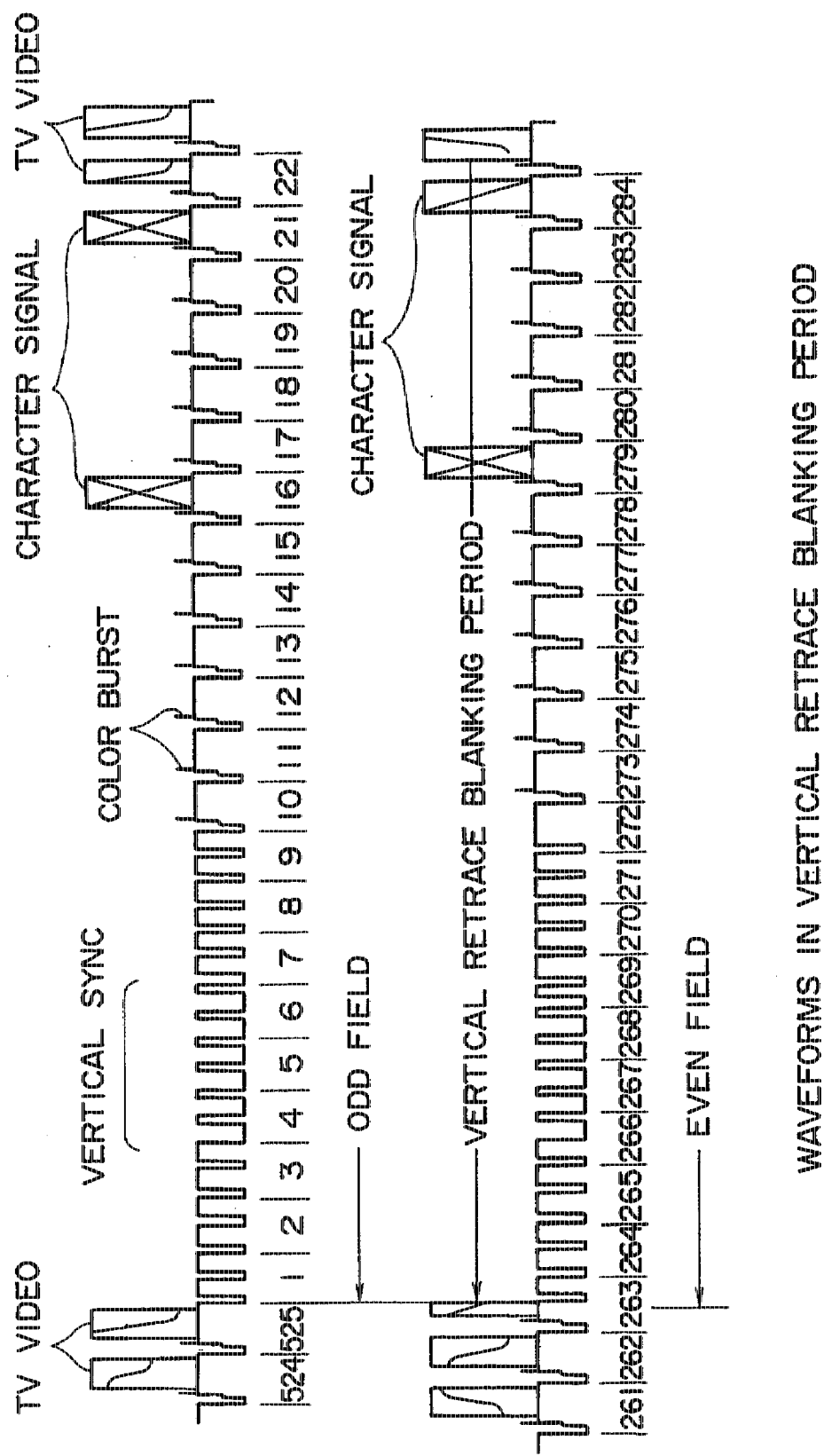
FIG. 1 shows waveforms of a telecast signal during its vertical blanking period.

The teletext adapted for transmission of such various information (character broadcast data) is performed in the following manner. As shown in FIG. 1, character broadcast data is broadcast after being superimposed in the form of digital signal during the vertical blanking interval of a telecast video signal which is in an analog form.

FIG. 1 shows the waveforms of a telecast video signal based on the NTSC system and obtained during the vertical blanking period thereof, in which the upper and lower waveforms correspond to an odd-field vertical blanking period and an even-field one, respectively.

Theoretically, the character broadcast data (described as character signal in FIG. 1) can be superimposed, during a vertical blanking period (vertical retrace blanking interval), on 10th to 21st H (lines) and on 273rd to 284th H where none of equivalent pulses is existent. However, considering some harmful effect of the video signal onto the displayed picture, it is ordinary at present that the teletext is performed with character broadcast data superimposed on 16th, 21st, 279th and 284th H.

There is known a pattern system and a code system for transmission of data. In the pattern system, characters or graphics is converted into character broadcast data of digital signals where 0 or 1 indicates a unit pixel, and then such converted data are transmitted. In this case, on the receiving side, the character broadcast data is once stored in a memory, and such data is displayed after being read out therefrom in synchronism with sync pulses of the video signal. Meanwhile in the code system, characters or graphics are transmitted in the form of predetermined codes. More specifically, characters and graphic elements are so classified in advance as to correspond to predetermined codes, and characters are transmitted after conversion into the corresponding codes, while each graphic is first decomposed into predetermined graphic elements when necessary, and such graphic elements are transmitted after conversion into the corresponding codes. In this case, the receiving side is equipped with a character generator for generating characters or graphic elements which correspond to the input codes respectively. Therefore the characters or graphic elements can be generated by the generator in accordance with the received codes and then are once stored in a memory, and subsequently such characters or graphic elements are displayed in the same manner as in the pattern system.

Since the pattern system transmits characters or graphics in units of pixels, it is possible to perform transmission of even complicated characters or graphics with minimal display errors, but due to a great quantity of the required data, there exists a disadvantage that the characters or graphics transmittable per unit time are small in amount. Meanwhile in the code system which transmits characters or graphics by codes, the quantity of the required data is smaller, and the characters or graphics transmittable per unit time are greater in amount. However, there are some disadvantages also in this system that many display errors are caused and a generator is needed on the receiving side. For the reasons mentioned above, there is currently discussed a hybrid system where frequently used characters or simple graphics are transmitted in the code system while infrequently used characters or complicated characters and graphics are transmitted in the pattern system. FIG. 2 shows fundamental parameters employed in the pattern system and the hybrid system.

As shown in FIG. 2, there are five display modes in the teletext, i.e., whole-screen stationary display, superimposed stationary display, caption display, whole-screen vertical scroll display, and one-row horizontal scroll display. A display screen according to in the teletext is composed of, e.g., 248×204 pixels where each sub-block is composed of 8 horizontal pixels by 12 vertical pixels. In the whole-screen stationary display mode, characters or graphics arranged on the whole display screen are displayed in a still state. In the superimposed stationary display mode, characters or graphics arranged on the whole display screen are displayed in a still state while being superimposed on a telecast picture. In the caption display mode, information for complementing the contents of a telecast program or the like is displayed as a caption while being superimposed on a telecast picture. This mode is used for displaying, for example, a foreign film together with Japanese caption and is also useful for transmitting a caption, which represents words or contents of a telecast program, for viewers having hearing difficulties.

In the whole-screen vertical scroll display mode, characters or graphics arranged on the whole display screen except a page header (uppermost row on the screen) are displayed while being scrolled upward at an adequate speed. And in the one-row horizontal scroll display mode, one row on the display screen is superimposed on a telecast picture and is displayed while being scrolled leftward for example.

Figure 3:
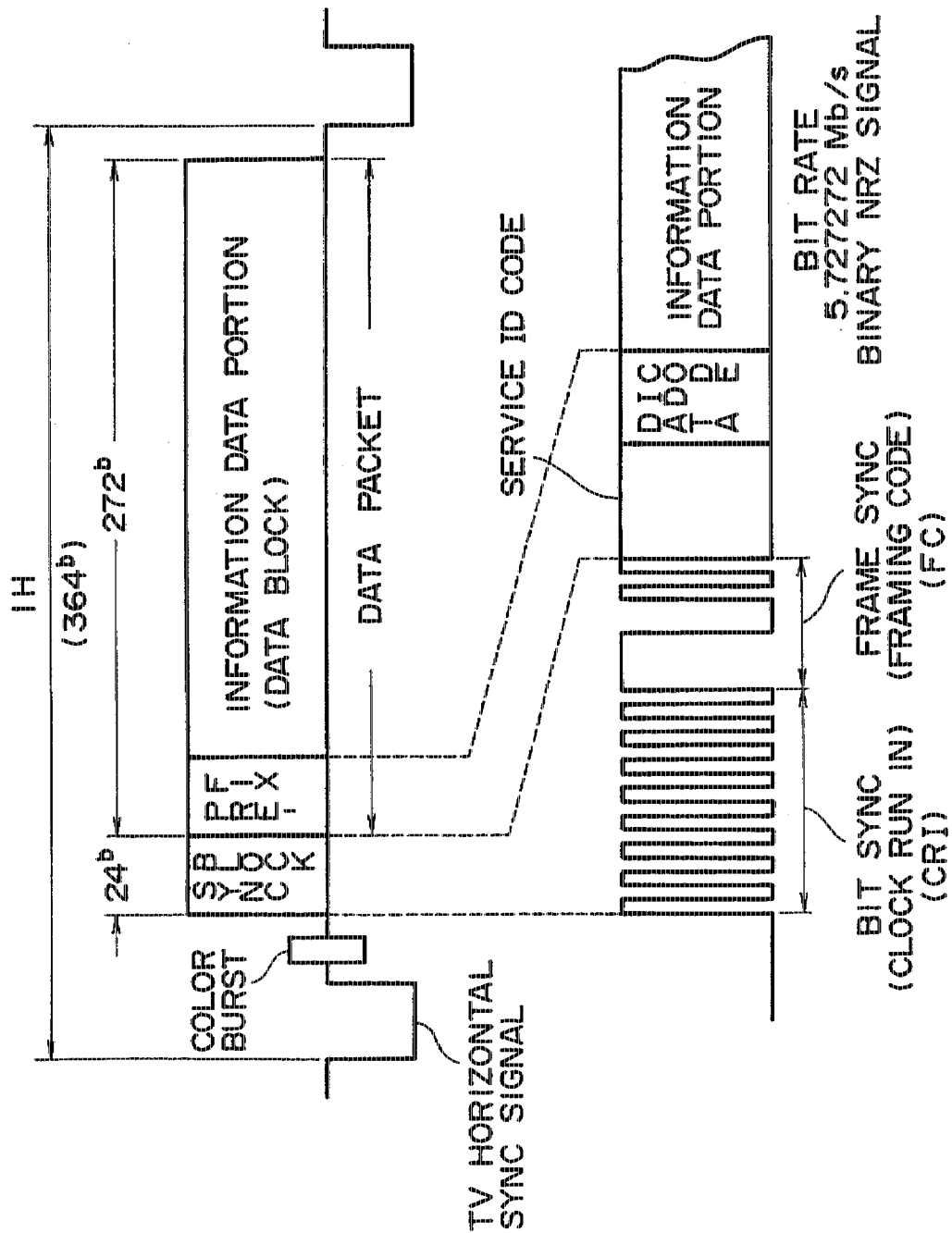
FIG. 3 shows the format of a data packet.

Character broadcast data is transmitted in units of data packets each consisting of one H (horizontal scanning line) of a telecast video signal. FIG. 3 shows the composition of such a data packet. Similarly to a normal horizontal scanning line, a horizontal synchronizing signal (H sync) (television horizontal synchronizing signal) is disposed at the top, and a color burst is disposed next. Posterior to the color burst, a sync portion, a prefix and information data portion (data block) are disposed successively in this order. The data packet is composed of the prefix and the information data portion.

The sync portion is composed of a clock run-in (CRI) for attaining bit synchronization and a framing code (FC) for attaining frame synchronization. The prefix is composed of service identification code and data identification code. The service identification code includes a code for identifying one of teletext, facsimile or other broadcasting service used to provide the data disposed in the information data portion. Meanwhile the data identification code includes a code for identifying either a pattern system or a code system used for transmission, and also a code for identifying one of the aforementioned display modes. In the information data portion, there are disposed substantial data (character broadcast data) inclusive of codes corresponding to characters or graphic elements, digital signal (picture data) 0 or 1 each representing a pixel unit, color information (color code) given to characters or graphics, and other information (e.g., control signal for the page a display picture).

Since the format of FIG. 3 is employed for any of data packets based on the pattern system and the code system, a change to either system from the other is executable with facility, and it is also easy to perform extension to a hybrid system which is a combination of the above two systems.

Figure 4:
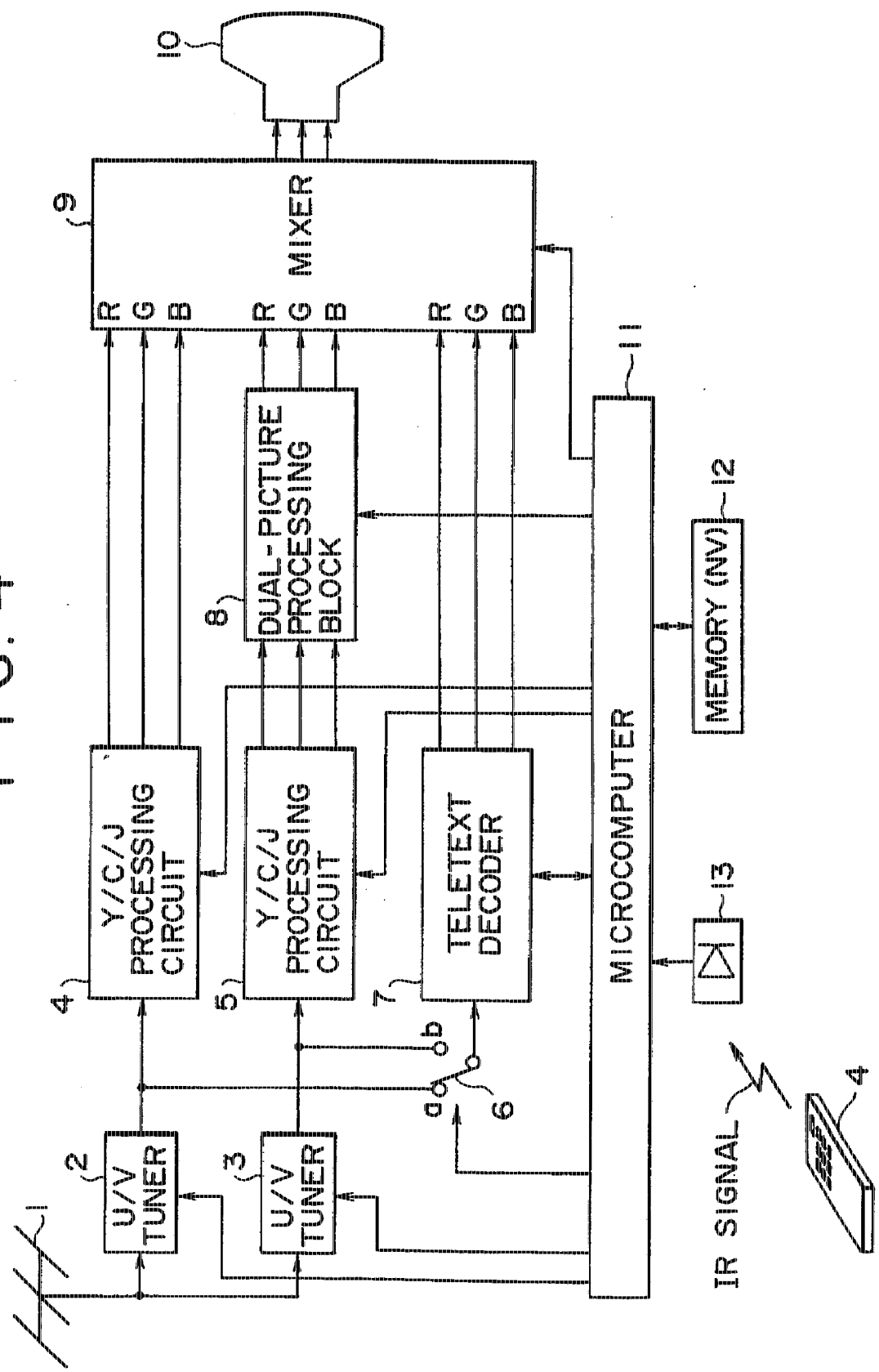
FIG. 4 is a block diagram showing the constitution of an embodiment of a television receiver where the present invention is applied.

FIG. 4 shows the constitution of an embodiment representing a television receiver which is adapted for viewing multiplex broadcast by the teletext mentioned above. An antenna 1 is installed for receiving telecast ground waves of, e.g., VHF and UHF bands based on the NTS system, and the received signal is supplied to U/V (UHF/VHF) tuners (hereinafter referred to as tuners) 2 and 3. In response to an instruction from a microcomputer 11, the tuner 2 or 3 (first and second receiving means) detects and demodulates the telecast signal of a predetermined channel out of the input signal received via the antenna 1, and then delivers the video signal, out of the demodulated signal thus obtained, to a Y/C/J (Y/C separation/jungle) processing circuit (hereinafter referred to simply as processing circuit) 4 or 5. The video signal outputted from the tuner 2 or 3 is also supplied to a terminal a or b of a switch 6.

The audio signal included in the demodulated signal is supplied to an unshown loudspeaker, which then outputs the sound therefrom.

The processing circuit 4 or 5 is controlled by the microcomputer 11 and separates the output video signal of the tuner 2 or 3 into a luminance component (Y) and a chroma component (C), and further converts the luminance and chroma components into three red, green and blue (RGB) components. The output of the processing circuit 4 is supplied to a mixer 9, while the output of the processing circuit 5 is supplied via a dual-picture processing block 8 to the mixer 9.

The switch 6 (selector means) is controlled by the microcomputer 11 and selects either of the terminals a and b to thereby supply either of the output video signals of the tuners 2 and 3 to a teletext decoder (hereinafter referred to simply as decoder) 7.

The decoder 7 (decode means) extracts, from the video signal supplied thereto from the tuner 2 or 3 via the switch 6, the horizontal scanning lines where the character broadcast data is superimposed (e.g., 16th, 21st, 279th and 284th H in the vertical blanking period as explained in FIG. 1), and then decodes the data (to form a picture with display of the character broadcast).

Figure 5:
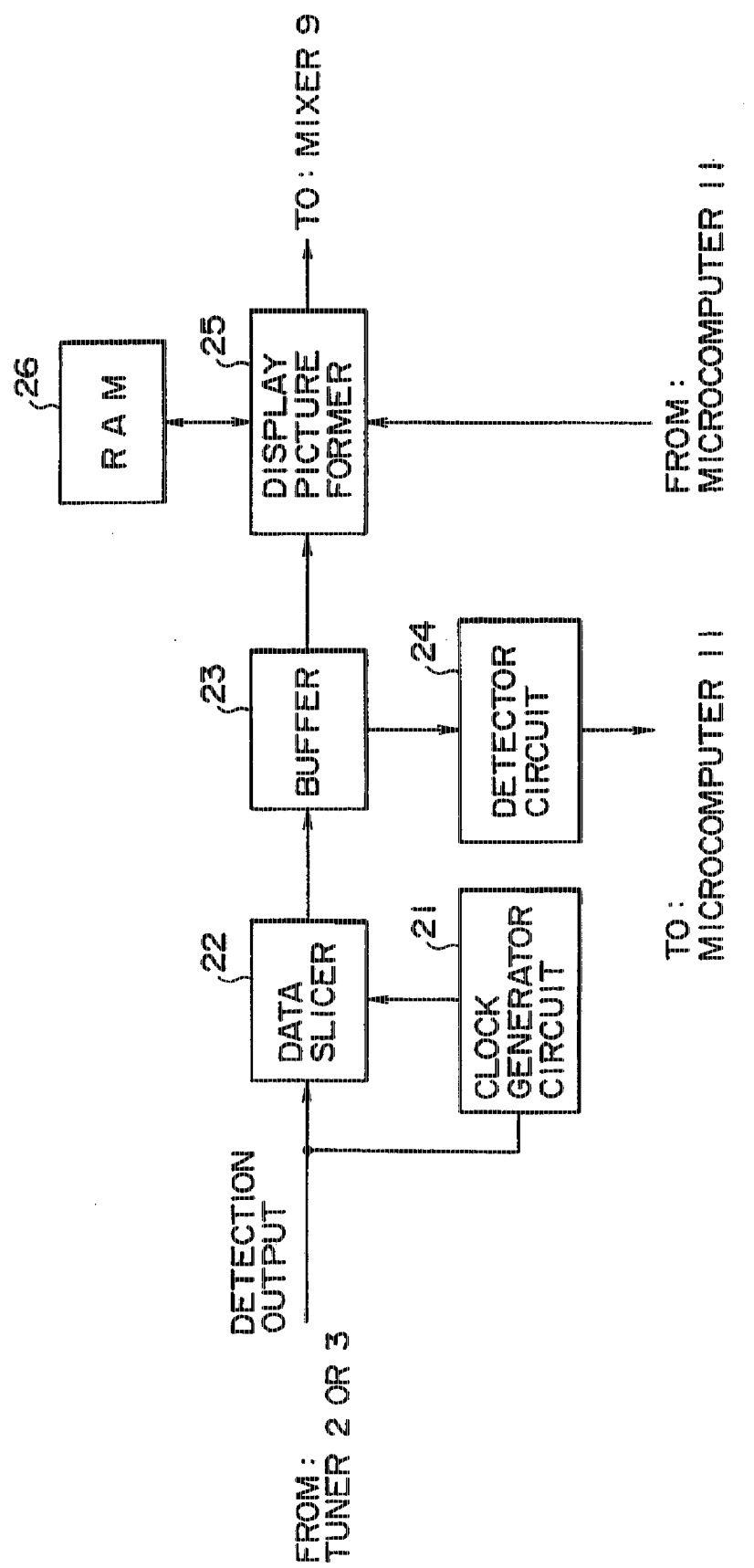
FIG. 5 is a block diagram showing a detailed exemplary structure of the decoder 7 in FIG. 4.

FIG. 5 shows an exemplary detailed structure of the decoder 7. The video signal supplied from the tuner 2 or 3 via the switch 6 is subsequently supplied to a clock generator circuit 21 and a data slicer 22. The clock generator circuit 21 generates, in accordance with the video signal inputted thereto, a clock signal synchronized with the video signal and then supplies the clock signal to the data slicer 22. Thereafter the data slicer 22 recognizes, in response to the clock signal obtained from the clock generator circuit 21, the timing of the horizontal scanning line where the character broadcast data (data packet) is superimposed out of the input video signal, and extracts the character broadcast data superimposed on the relevant horizontal scanning line. The character broadcast data thus extracted is supplied to a buffer 23 to be stored therein temporarily.

A detector circuit 24 (detection means) detects whether the character broadcast data stored in the buffer 23 represents a caption or not. If the result of such detection signifies a caption, this information is sent to the microcomputer 11. The above detection is performed with reference to the data identification code (display mode preset as a data identification code in the data packet) explained in FIG. 3.

A display picture former 25 reads out the character broadcast data stored in the buffer 23 and converts the same into data to form a character broadcast display picture (hereinafter referred to simply as display data). The display data is once stored in a RAM 26, and the display picture former 25 reads out the display data from the RAM 26 in response to an instruction from the microcomputer 11. And after execution of some processes such as coloring, flushing and concealment required for display, the display picture former 25 converts the processed data into an RGB video signal and outputs the same to a mixer 9.

Referring back to FIG. 4 again, the dual-picture processing block 8 is controlled by the microcomputer 11 and outputs the video signal (RGB signal), which is supplied from the processing circuit 5, to the mixer 9 either directly or after converting the signal in such a manner as to compose a child picture in a picture-in-picture mode. The mixer 9 (output means) is controlled by the microcomputer 11 and outputs to a monitor 10 one of the video signal (RGB signal) supplied from the processing circuit 4, the video signal supplied from the processing circuit 5 via the dual-picture processing block 8, and the video signal supplied from the decoder 7, either directly or after compositing two of such signals. The monitor 10 consists of a CRT or the like and serves to display the output of the mixer 9.

The microcomputer 11 (control means) controls the selective change of the switch 6 as mentioned above and further controls the other blocks constituting the apparatus. The memory 12 is a nonvolatile type for example and is used for storing the last channel (one selected immediately before turn-off of the power supply) and the data required for the operation of the microcomputer 11. When the power supply for the television receiver is turned on, the microcomputer 11 refers to the memory 12 and controls the tuner 2 (or 3) to receive the last channel stored therein. In case the last channel is not stored in the memory 12, the microcomputer 11 controls the tuner 2 (or 3) in a manner to receive a preset channel.

A sensor 13 receives an infrared (IR) signal from a remote commander 14, then executes photoelectric conversion of the signal and supplies the same to the microcomputer 11. In response to the signal from the sensor 13 also, the microcomputer 11 is capable of controlling each of the blocks which constitute the apparatus. The remote commander 14 is equipped with various operating buttons (e.g., power on/off button, channel selection button, volume control button and so forth), and when any of such buttons is manipulated, an IR signal corresponding to the relevant button is outputted from the remote commander 14. Since the IR signal is inputted via the sensor 13 to the microcomputer 11, manipulation of the remote commander 14 enables the microcomputer 11 to execute any desired process. Although not shown, a control panel is provided in the television receiver as well to execute the same process as that effected by manipulation of the remote commander 14.

Figure 6:
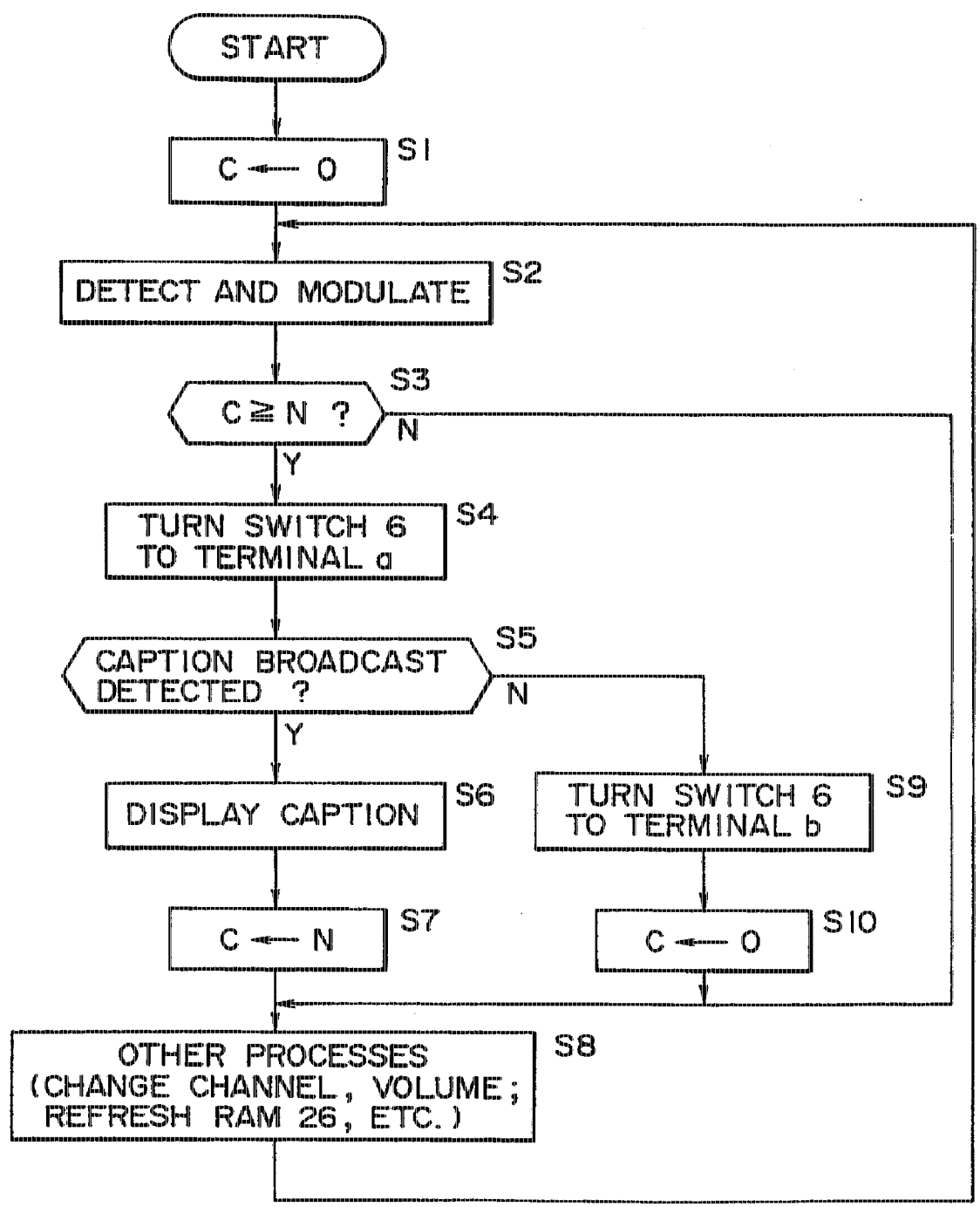
FIG. 6 is a flow chart for explaining the operation of the embodiment shown in FIG. 4.

Now the operation will be described below with reference to a flow chart of FIG. 6. First at step S1, 0 is set as an initial value in a variable C for clocking a predetermined time. The storage area for the variable C is secured previously in the memory 12, and the microcomputer 11 increments the variable C in synchronism with a system clock signal supplied from a clock circuit (now shown).

Subsequently the operation proceeds to step S2, where the telecast signal received by the antenna 1 is detected and demodulated in the tuner 2 or 3, and the video signal obtained as the result is displayed on the monitor 10. More specifically, the last channel stored in the memory 12 is read out therefrom by the microcomputer 11 immediately after turn-on of the power supply, and a control signal (PLL signal) is outputted to the tuner 2 so as to receive the last channel. In this case, the tuner 2 detects and demodulates, in response to an instruction from the microcomputer 11, the signal corresponding to the last channel out of the entire telecast signals obtained from the antenna 11, and then outputs the demodulated signal to the processing circuit 4. Thereafter the processing circuit 4 processes the demodulated signal to convert its video signal into an RGB signal and supplies the same to the mixer 9. In this stage, the microcomputer 11 controls the mixer 9 in such a manner as to directly output the video signal supplied thereto from the tuner 2 via the processing circuit 4, so that the video signal obtained from the tuner 2 via the processing circuit 4 is outputted from the mixer 9 without any change to the monitor 10 and then is displayed thereon. Consequently, the program (picture) of the last channel is displayed in this case.

Subsequently the operation proceeds to step S3, where a decision is made by the microcomputer 11 as to whether the variable C is greater than N or not. Here, N denotes a positive integer. If the result of the decision at step S3 signifies that the variable C is not greater than N, i.e., if a predetermined time has not elapsed yet after presetting of the initial value 0 in the variable C at step S1 or undermentioned step S10, the operation proceeds to step S8 where required processes (other processes) for changing the channel or the volume and refreshing the RAM 26 are executed in the microcomputer 11, and thereafter the operation returns to step S2.

For example, when the viewer has manipulated the remote commander 14 in a manner to select some other channel, an infrared manipulation signal corresponding to such manipulation is transmitted (emitted) from the remote commander 14. This infrared signal is received by the sensor 13 which performs photoelectric conversion of the input signal. The electric signal thus obtained, i.e., the manipulation signal corresponding to the manipulation of the remote commander 14, is supplied to the microcomputer 11. In response to this manipulation signal, the microcomputer 11 controls the tuner 2 at step S8 in a manner to receive the channel corresponding to the manipulation signal, whereby the program of the channel selected by the viewer is displayed on the monitor 10 at step S2 as in the aforementioned case.

When the viewer has manipulated the remote commander 14 in a manner to display, as a parent picture, the program of the channel being displayed currently on the monitor 10 and to display the program of the other channel as a child picture, a manipulation signal corresponding to such manipulation of the remote commander 14 is received by the microcomputer 11 as in the case mentioned above. In response to the input manipulation signal, the microcomputer 11 outputs a control signal (PLL signal) to the tuner 3 at step S8 for receiving the other channel. Subsequently in the tuner 3, a signal corresponding to the other channel, out of the entire telecast signals obtained from the antenna 11, is detected and demodulated, and then the signal thus demodulated is outputted to the processing circuit 5. Thereafter the processing circuit 5 converts the video signal, which is included in the modulated signal, into an RGB signal and outputs the same to the dual-picture processing block 8, as in the aforementioned case of the processing circuit 4.

In this stage of the operation, the microcomputer 11 is controlling the dual-picture processing block 8 to display the output of the processing circuit 5 as a child picture, whereby the video signal supplied from the processing circuit 5 is so converted as to form a child picture in the dual-picture processing block 8, and then the converted video signal is outputted to the mixer 9. At this time, the microcomputer 11 further sends a control signal to the mixer 9 for compositing a picture-in-picture image where the output of the processing circuit 4 is displayed as a parent picture while the output of the dual-picture processing block 8 is displayed as a child picture, so that the output of the processing circuit 4 and the output of the dual-picture processing block 8 are combined with each other in the mixer 9 to form a picture-in-picture image. And this picture-in-picture image is outputted to the monitor 10 to be displayed thereon. In the manner described above, the program of one channel or that of the other channel received by the tuner 2 or 3 is displayed as a parent picture or a child picture at step S2 in the picture-in-picture mode.

When the viewer has manipulated the remote commander 14 in such a manner as to display the program of one channel CHA or that of the other channel CHB on the left-half screen or the right-half screen (hereinafter referred to as left screen and right screen, respectively) of the monitor 10, a manipulation signal corresponding to such manipulation of the remote commander 14 is received by the microcomputer 11, as in the foregoing case. Subsequently, in response to this manipulation signal, the microcomputer 11 sends a control signal to the tuner 3 or 4 at step S8 for receiving the channel CHA or CHB, whereby the signal corresponding to the channel CHA or CHB, out of the entire telecast signals obtained from the antenna 11, is detected and demodulated in the tuner 3 or 4, and then the demodulated signal is outputted via the processing circuit 4 or 5 to the mixer 9 or the dual-picture processing block 8.

In this stage of the operation, the microcomputer 1 is controlling the dual-picture processing block 8 to deliver the output of the processing circuit 5 directly without any change, whereby the video signal of the channel CHB supplied from the processing circuit 5 is outputted directly from the dual-picture processing block 8 to the mixer 9. At this time, the microcomputer 11 further sends a control signal to the mixer 9 so that the left picture or the right picture on the screen of the monitor 10 is composed of the output of the processing circuit 4 or that of the dual-picture processing block 8 (hereinafter the image of such composition will be referred to as picture-and-picture (P&P) image). Consequently in the mixer 9, the output of the processing circuit 4 and that of the dual-picture processing block 8 are combined with each other to compose the picture-and-picture image. This image is outputted to the monitor 10 to be displayed thereon. In this manner, there is displayed, at step S2, the picture-and-picture image where the left picture or the right picture is composed of the program of the channel CHA or CHB received by the tuner 2 or 3.

When the viewer has manipulated the remote commander 14 in a manner to select a teletext program of a predetermined channel, a manipulation signal corresponding to such manipulation is received by the microcomputer 11 in the same manner as described above. In response to this manipulation signal, the microcomputer 11 sends a control signal to the tuner 3 at step S8 for receiving the predetermined channel, whereby a signal corresponding to the predetermined channel, out of the entire telecast signals obtained from the antenna 11, is detected and demodulated in the tuner 3. Since the microcomputer 11 is controlling the switch 6 at this time to select the terminal b, the demodulated signal outputted from the tuner 3 is supplied to the decoder 7 via the terminal b and the switch 6.

In the decoder 7 (FIG. 5), the video signal supplied via the switch 6 is inputted to the clock generator circuit 21 and the data slicer 22, and subsequently a clock signal synchronized with the input video signal is generated in the clock generator circuit 21. The clock signal thus obtained is supplied to the data slicer 22.

In accordance with the clock signal obtained from the clock generator circuit 21, the data slicer 22 recognizes the timing of the horizontal scanning line on which the character broadcast data (data packet) included in the input video signal is superimposed, and then extracts the character broadcast data superimposed on the relevant horizontal scanning line. The character broadcast data thus extracted is supplied to the buffer 23 to be temporarily stored therein. Subsequently the character broadcast data stored in the buffer 23 is read out therefrom in the display picture former 25 and then is converted into display data. This display data is once stored in the RAM 26.

In this stage of the operation, the microcomputer 11 is controlling the display picture former 25 to output the display data, so that the display picture former 25 reads out the display data from the RAM 26 in response to an instruction from the microcomputer 11 and, after executing the process required for display, converts the display data into an RGB video signal and then outputs the same to the dual-picture processing block 8. At this time, the microcomputer 11 further controls the dual-picture processing block 8 in a manner to deliver the output of, e.g., the decoder 7 without any change while controlling the mixer 9 to deliver the output of the dual-picture processing block 8 also without any change, whereby the video signal from the decoder 7 is outputted to the monitor 10 as it is via the dual-picture processing block 8 and the mixer 9. Consequently, the character broadcast picture of the channel received by the tuner 3 is displayed at step S2.

When the viewer has manipulated the remote commander 14 in a manner to display a telecast program of one channel CHA or a teletext program of the other channel CHB on the left screen or the right screen of the monitor 10, a manipulation signal corresponding to such manipulation is received by the microcomputer 11, as in the case described above. In response to this manipulation signal, the microcomputer 11 sends a control signal to the tuner 3 or 4 to receive the channel CHA or CHB at step S8, whereby the signal corresponding to the channel CHA or CHB, out of the entire telecast signals received from the antenna 11, is detected and demodulated in the tuner 3 or 4, and thus a demodulated signal is obtained.

At this time, the microcomputer 11 is controlling the switch 6 to select the terminal b, whereby the demodulated signal outputted from the tuner 3 is supplied to the decoder 7 via the terminal b and the switch 6, while the demodulated signal outputted from the tuner 2 is supplied to the mixer 9 via the processing circuit 4.

Meanwhile a teletext picture of the channel CHB is formed in the decoder 7 as mentioned and then is outputted to the mixer 9. In this stage of the operation, the microcomputer 11 sends a control signal to the mixer 9 in such a manner that the left picture or the right picture on the monitor 10 is composed of the output of the processing circuit 4 or the decoder 7, whereby the output of the processing circuit 4 and that of the decoder 7 are combined with each other to constitute the picture-and-picture image. The picture-and-picture image thus produced is then outputted to the monitor 10 to be displayed thereon. Consequently at step S2, there is displayed the picture-and-picture image where the left picture or the right picture is composed of the telecast program of the channel CHA or the teletext program of the channel CHB received by the tuner 2 or 3.

When the viewer has manipulated the remote commander 14 in a manner to display a telecast program of one channel or a teletext program of the same channel on the left screen or the right screen of the monitor 10, the microcomputer 11 controls the switch 6 to select the terminal a. In this case, the output of the tuner 2 is supplied to the decoder 7, so that a picture-and-picture image composed of the telecast program and the teletext program of the same channel is displayed on the monitor 10 similarly to the above.

In case the tuner 3 need not be actuated and the viewer has already reserved reception of a teletext program of a desired channel, the microcomputer 11 controls the tuner 3 to receive the desired channel while controlling the switch 6 to select the terminal b. Further in this case, the microcomputer 11 controls the display picture former 25 to always store the latest display data in the RAM 26 of the decoder 7, i.e., to refresh the RAM 26. In this case, therefore, the display data of the latest teletext program received by the tuner 3 is always stored in the RAM 26, so that if the reception is switched from a normal telecast to a teletext, the latest teletext can be displayed immediately by reading out the display data from the RAM 26.

Meanwhile, if the result of the decision at step S3 signifies that the variable C is greater than N, i.e., a predetermined time has already elapsed from setting of an initial value 0 in the variable C at step S1 or S10, the operation proceeds to step S4. And in case the switch 6 presently selects the terminal b (e.g., when the switch 6 is selectively turned to the terminal b for refreshing the RAM 26 as described), the switch 6 is changed forcibly to the terminal a by the microcomputer 11. In case the switch 6 has already selected the terminal a, the process at step S4 is skipped.

Then the operation proceeds to step S5, where a decision is made by the microcomputer 11 as to whether the character broadcast data, which is superimposed on the telecast signal of the channel received (detected and demodulated) by the tuner 2, represents a caption corresponding to the words or contents of the program of that channel.

More specifically, when the switch 6 is turned to be connected to the terminal a, the demodulated signal outputted from the tuner 2 and supplied to the processing circuit 4 is also supplied to the decoder 7 as well via the terminal a and the switch 6. In the decoder 7, as mentioned, the character broadcast data superimposed on the demodulated signal (video signal) outputted from the tuner 2 is stored in the buffer 23. Thereafter a detection is executed in the detector circuit 24 as to whether the character broadcast data stored in the buffer 23 represents a caption or not by referring to the data identification code, as described. And in accordance with the output of the detector circuit 24, the microcomputer 11 makes a decision as to whether the character broadcast data superimposed on the telecast signal of the channel received by the tuner 2 represents a caption or not.

If the result of the decision at step S5 signifies that the character broadcast data superimposed on the telecast signal of the channel received by the tuner 2 does not represent any caption, the operation proceeds to step S9, where the switch S6 is turned to be connected to the terminal b by the microcomputer 11. In case the process at step S4 is skipped, the process at step S6 is also skipped.

Thereafter the operation proceeds to step S10, where an initial value of 0 is set in the variable C and then the process of clocking the predetermined time is started again. Upon completion of the process at step S10, the operation returns to step S2 through step S8.

Meanwhile, if the result of the decision at step S5 signifies that the character broadcast data superimposed on the telecast signal of the channel received by the tuner 2 represents a caption, the operation proceeds to step S6, where the character broadcast data representing a caption is displayed. In this case, the microcomputer 11 controls the display picture former 25 of the decoder 7 to output the caption while controlling the mixer 9 in a manner to combine (superimpose in this case) the output caption of the decoder 7 with (on) the video signal outputted from the processing circuit 4. Consequently, the mixer 9 produces a video output where the caption is superimposed on the telecast program, and then this video output is displayed on the monitor 10.

Therefore, when a normal telecast program of one channel alone is displayed as shown in FIG. 7A for example, if a closed-caption teletext is started on the same channel, the caption started to be broadcast by the teletext on the relevant channel is superimposed on the picture of the normal telecast program of that channel. In another example of FIG. 7B where a normal telecast program of one channel CHA and a teletext program of the other channel CHB are displayed in a picture-and-picture mode, if a closed-caption teletext is started on the channel CHA, then the caption started to be broadcast by the teletext on the channel CHA is displayed while being superimposed on the picture of the program of the channel CHA.

Subsequently the operation proceeds to step S7 where N is set in the variable C, and then returns to step S2 through step S8. Since N is set in the variable C at step S7 as mentioned during the period in which the character broadcast data represents a caption, the operation always proceeds to step S4 after the decision at step S3.

As described above, a detection is executed cyclically (at a predetermined time interval) as to whether the character broadcast data superimposed on the telecast signal of the channel received by the tuner 2 represents a caption or not, and if the result of such detection signifies that the character broadcast data represents a caption, the caption is displayed while being superimposed on the picture of the telecast program being received. Thus, in case a closed-caption teletext is broadcast on the channel being currently received, it becomes possible to perform priority display of the caption without the necessity of incorporating two decoders to decode the character broadcast data, i.e., without causing a dimensional increase of the apparatus or raising the production cost thereof.

Accordingly, when some viewer having auditory impairments for example desires priority display of the caption upon start of its broadcast by the teletext, the viewer is rendered free from troublesome manipulation of the remote commander 14 to confirm if the closed-caption television is being broadcast or not.

Although a description has been given above with regard to an exemplary case of applying the present invention to a television receiver which is adapted to receive telecast signals transmitted with ground waves, it is to be understood that the present is applicable also to any other apparatus for receiving telecast signals transmitted via, e.g., a satellite broadcasting network or a CATV network.

When the RAM 26 need not be refreshed, a detection as to whether the character broadcast data superimposed on the telecast signal received by the tuner 2 represents a caption or not can be executed by causing the tuner 3 to receive the same channel as the one being received by the tuner 2 and then supplying the output of the tuner 3 to the decoder 7 via the switch 6.

The above embodiment is so devised that, when the switch 6 is in the position to select the terminal b, the switch 6 is changed to the terminal a cyclically (every time the variable C becomes equal to N). However, the action of changing the switch 6 may be performed non-periodically as well.

Also in the embodiment, when the character broadcast data represents a caption, the caption is displayed forcibly. However, instead of such forcible display, the related information may be given to the viewer by means of the monitor 10 or an unshown loudspeaker. Since there may be some viewers who prefer no display of the caption even when the caption broadcast is started by the teletext, it is desired that forcible display of the caption be selectively settable by the individual viewers.

Furthermore, the monitor 10 and the other blocks can be constructed as separate devices.

It is to be understood that the telecast system is not limited to the one based on the NTSC system alone, and the teletext transmission system is not limited to any particular one at all.

Although the above embodiment is fundamentally so constituted that the tuners 2 and 3 serve to receive a normal telecast and a teletext respectively, the broadcasts to be received by the tuners 2 and 3 may be reverse in principle to those described in the above example.

The description given in the embodiment is concerned with an exemplary case where character broadcast data is superimposed during a vertical blanking period of a telecast video signal. However, the present invention is applicable also to another case where character broadcast data is superimposed during, for example, a horizontal blanking period of a video signal.

As described hereinabove, according to the receiving apparatus and method of the present invention, when the demodulated signal outputted from the second receiving means is selected by the selector means, the selector means is enabled to periodically select the demodulated signal outputted from the first receiving means. Meanwhile, when the demodulated signal outputted from the first receiving means is selected by the selector means, a detection is performed as to whether the character broadcast data extracted by the decoder means represent a caption or not. And if the result of such detection signifies that the character broadcast data represent a caption, the selector means is forced to select the demodulated signal outputted from the first receiving means. Consequently, it becomes possible to achieve priority display of the caption without causing any dimensional increase of the apparatus or raising the production cost thereof.

Although the present invention has been described hereinabove with reference to the preferred embodiment thereof, it is to be understood that the invention is not limited to such embodiment alone, and a variety of other modifications and variations will be apparent to those skilled in the art without departing from the spirit of the invention.

The scope of the invention, therefore, is to be determined solely by the appended claims.

What is claimed is:

1. An apparatus for receiving telecast signals where character broadcast data is superimposed as teletext data, said apparatus comprising:

first and second receiving means each for receiving said telecast signals, for demodulating said telecast signals of predetermined channels, and for outputting respective demodulated signals;

decoder means for extracting said character broadcast data from one of said demodulated signals outputted respectively from said first and second receiving means, decoding the extracted data, and outputting a decoded data;

output means for selectively delivering as an output one of the outputs of said first and second receiving means and said decoder means, or combining two of the outputs of said first and second receiving means and delivering a combined output as the output;

selector means for selecting one of said demodulated signals from said first and second receiving means and supplying a selected signal to said decoder means;

control means for controlling said selector means during its selection of said demodulated signal outputted from said second receiving means so as to force said selector means to periodically select said demodulated signal outputted from said first receiving means; and detector means for detecting whether said character broadcast data extracted by said decoder means represents a caption when said selector means has selected said demodulated signal outputted from said first receiving means, wherein when said detector means detects a caption, said control means controls said selector means to select said demodulated signal outputted from said first receiving means.

2. The receiving apparatus according to claim 1, further comprising display means for displaying said output of said output means.

3. The receiving apparatus according to claim 1, wherein when said detector means detects a caption, said output means combines said demodulated signal output from said first receiving means and said decoded data output from said decoder means, and delivers said combined output as said output.

4. A receiving method carried out in a receiving apparatus including first and second receivers for receiving telecast signals where character broadcast data is superimposed as teletext data for demodulating said telecast signals of predetermined channels and for outputting respective demodulated signals, a decoder for extracting the character broadcast data from either of the demodulated signals outputted from said first and second receivers and decoding the extracted data, an output circuit for selectively delivering one of the outputs of said first and second receivers and said decoder or combining two of said outputs and delivering a combined output, and a selector for selecting either of the signals outputted from said first and second receivers and supplying the selected signal to said decoder, said receiving method comprising the steps of:

enabling said selector to periodically select said demodulated signal output from said first receiver when the demodulated signal outputted from said second receiver is selected by said selector;

detecting whether the character broadcast data extracted by said decoder represents a caption when the demodulated signal outputted from said first receiver is selected by said selector; and controlling said selector to select the demodulated signal output from said first receiver when the result of such detection represents a caption.

5. The receiving method according to claim 4, further comprising the step of combining the output of said first receiver and said decoder and displaying the combined output.

* * * * *